No. 621,517. Patented Mar. 21, 1899.
C. W. BLACKBURN.
WINE OR LARD PRESS.
(Application filed Feb. 28, 1898.)
(No Model.)
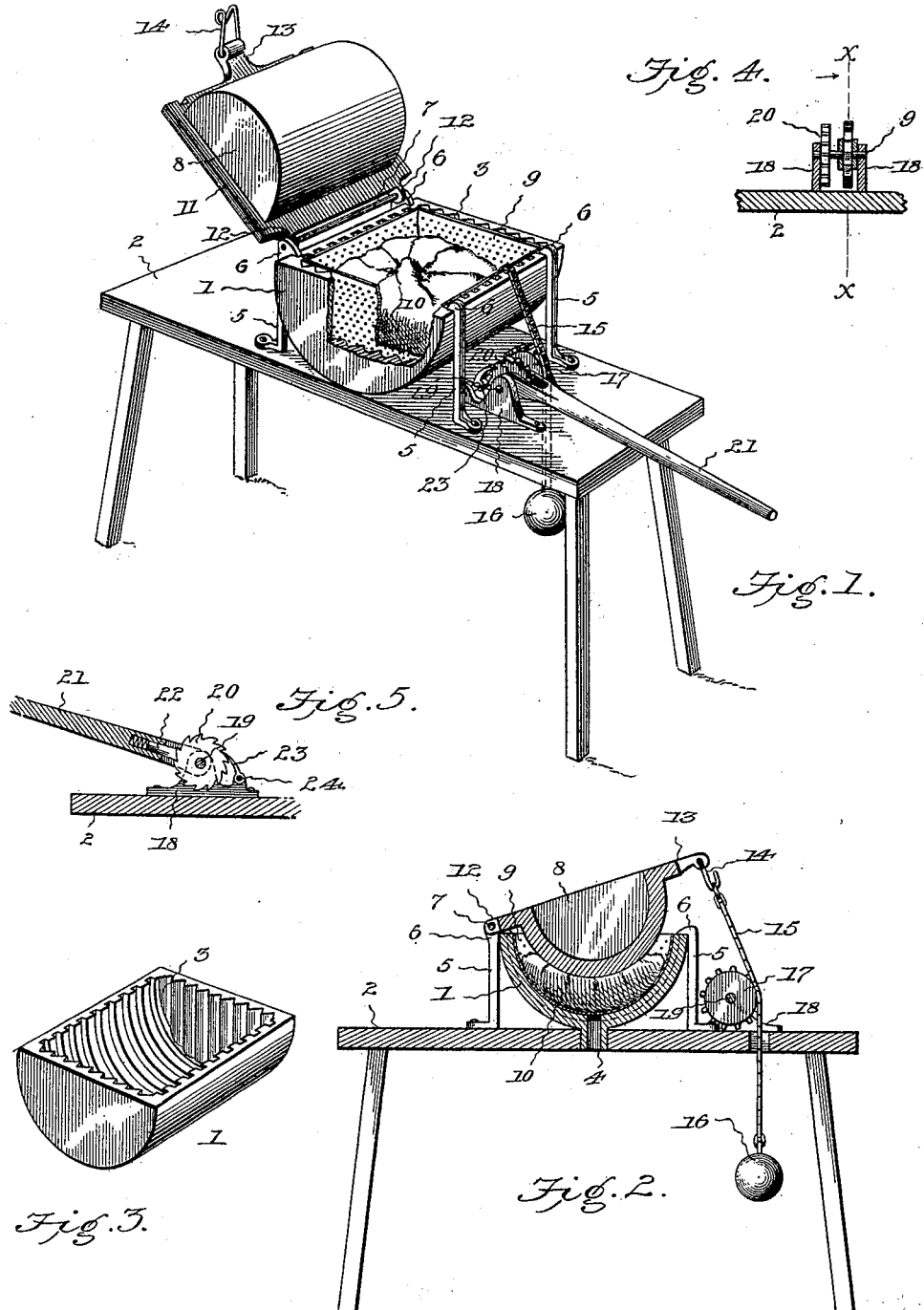

UNITED STATES PATENT OFFICE.

CHARLES W. BLACKBURN, OF LINCOLN, ILLINOIS.

WINE OR LARD PRESS.

SPECIFICATION forming part of Letters Patent No. 621,517, dated March 21, 1899.

Application filed February 28, 1898. Serial No. 672,069. (No model.)

*To all whom it may concern:*

Be it known that I, CHARLES W. BLACKBURN, a citizen of the United States, residing at Lincoln, in the county of Logan and State of Illinois, have invented a new and useful Wine or Lard Press, of which the following is a specification.

This invention relates to machines which are utilized in the manufacture of wines, lard, and jellies, and is designed to provide a press of simple construction, easy of operation, and capable of being quickly cleaned after use and to combine therewith actuating mechanism for moving the plunger or follower forward, so as to subject the article under treatment to a high degree of pressure, whereby the liquid portion is thoroughly separated from the solid matter.

The invention also has for its object the provision of a press which will strain the substance simultaneously with the expressing of the juices, pulp, or other liquid therefrom and which will provide ample clearance for supplying the article to the hopper and admit of the residue resulting from the compression being easily removed from the hopper, so as to place the machine in condition for further service without any appreciable loss of time, which is an important factor when a considerable quantity of fruit or fatty substances is to be pressed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a press constructed in accordance with this invention, the plunger or follower being thrown back out of the way and a portion of the hopper being broken away to disclose the strainer and the cloth. Fig. 2 is a central longitudinal section. Fig. 3 is a detail view in perspective of the hopper. Fig. 4 is a transverse section of the actuating mechanism. Fig. 5 is a detail view of the actuating mechanism about on the line X X of Fig. 4, looking to the right.

Corresponding and like parts are referred to in the following description and indicated in the drawings by the same reference characters.

The hopper 1 is secured to a bench 2 or other support in any substantial manner and is of semicircular outline in cross-section. This hopper is of malleable cast-iron and is provided on its inner sides with a series of grooves 3, forming channels for the escape of the fruit-juices, pulp, and fatty matter, according to the nature of the substance subjected to compression. The hopper is provided centrally with a discharge-opening, with which communicates a spout 4, through which the substance expressed finds exit. Rods or bars 5, having hooks 6 at their upper ends and having their lower ends bent and apertured, serve as means for securing the hopper to the bench, the hooked end 6 passing over the top edge of the front and rear walls of the hopper and the lower bent ends of the rods receiving bolts or like fastenings by means of which the said rods are made fast to the support. The rear set of rods are formed with transversely-alined openings, through which passes the pin 7, by means of which the follower or plunger 8 is pivotally connected therewith.

A pan 9, conformable to the interior of the hopper, fits snugly therein and is constructed of foraminous or reticulated sheet metal, the openings or perforations being of such a size as to prevent the passage therethrough of solid matter, which would clog or choke the grooves or passages 3. This perforated pan constitutes a strainer and receives the fruit or other article or substance to be pressed. A cloth 10 is fitted within the perforated pan 9 and supplements its action in straining the matter eliminated from the substance during the process of compression. The cloth receives the article to be pressed and its loose edge portions are folded thereover. After the article has been sufficiently pressed the residue or solid matter can be easily and quickly removed, since it is contained in the cloth, it being necessary only to lift up the cloth and remove it, together with the contents, from the perforate pan 9.

The follower or plunger 8 is of semicircular form to fit snugly within the hopper and is provided at its upper end with an outer flange 11, which extends over the upper edge of the hopper to prevent the juices and the like flying upward when liberated from the solid matter. This follower or plunger is hollow and is provided with rearwardly-extending arms 12, which have transversely-alining openings to receive the pin 7. A hook-shaped lug 13 extends forwardly from the front edge of the follower and receives a clevis 14 of hook form. A chain 15 makes detachable connection with the hooked end of the clevis 14 and passes through an opening in the bench or support and receives a weight 16 at its lower end, said weight serving to hold the chain in direct connection with the teeth of the spur-wheel 17, by means of which the chain is operated upon, so as to force the plunger or follower into the hopper and compress the substance placed therein. The lug 13 is located centrally of the follower, so as to equalize the strain thereon and upon the hinge members, by means of which the follower is pivotally connected to the upper ends of the rear rods 5.

Pillow-blocks 18 are secured to the front end of the bench or support and are disposed in parallel relation and are spaced apart sufficiently far to receive the actuating mechanism between them. A shaft 19 is journaled in the pillow-blocks and carries the spur-wheel 17 and a ratchet-wheel 20, both being secured to the shaft, so as to rotate therewith. The lever 21, having its inner end cleft, is loosely mounted upon the shaft 19, with its separated portions coming upon opposite sides of the ratchet-wheel 20, and this lever receives a spring-actuated dog 22 in the crotch, said dog operating in an opening formed in the lever between the cleft portions thereof. The dog 22 is constructed to ride upon the teeth of the ratchet-wheel 20 when moving the outer end of the lever upward and rearward and to engage with said teeth when moving said lever upward and forward, thereby turning the shaft 19 and the spur-wheel secured thereto and moving the chain 15 downward, whereby the compression is effected. A detent 23 is located in the rear of the ratchet-wheel and coöperates therewith to prevent backward rotation of the shaft 19 when moving the operating-lever to a new position. This detent is mounted upon a rod or shaft 24, supported at its ends in the pillow-blocks 18.

When in service, the parts are assembled about as shown in Fig. 1, and in order to admit of the substance or article being placed readily within the hopper the follower or plunger 8 is thrown backward, as clearly indicated in the said figure. After the loose end portions of the cloth 10 have been folded over the fruit or other article to be compressed the plunger or follower is turned down into position about as shown in Fig. 2 and the upper end of the chain 15 is engaged with the clevis 14. By rocking the lever 21 backward and forward the shaft 19 is rotated by an intermittent motion, and by reason of the chain engaging with the teeth of the spur-wheel 17 said chain will be moved downward and force the plunger into the hopper and effect an expressing of the juices, pulp, or like matter from the substance subjected to pressure. By weighting the lower end of the chain the latter is held in engagement with the teeth of the spur-wheel. After the process of pressing has been completed the chain is disconnected from the clevis and the follower or plunger thrown back out of the way, thereby admitting of the cloth 10 and contents being removed from the hopper. If after manually advancing the follower into the hopper to the desired point the press is allowed to stand, the weighted connection 15 will exert a constant pressure upon the follower, which in case of shrinkage of the contents of the hopper due to the draining of the liquid therefrom will still further advance the hopper to maintain a uniform pressure thereon.

Having thus described the invention, what is claimed as new, and desired to be secured by Letters Patent, is—

1. In a press of the class described, the combination of a hopper, a pivotal follower operating in the hopper, a flexible weighted connection under a constant tension attached to the free end of the follower to impart a constant forward impulse thereto, and manually-actuated operating mechanism engaged with the flexible connection for advancing the same in the direction of strain of its weight, to advance the follower within the hopper, substantially as specified.

2. In a press, the combination of a hopper, rods or bars securing the hopper to a support, the rear rods having their upper ends hooked to engage over the upper rear edge of the hopper and formed with transversely-alining openings, a follower having rearwardly-extending arms, a pin passing through corresponding openings of the said arms, and the hooked rods and serving to pivotally connect the follower therewith, and actuating mechanism applied to the free end of the follower, substantially as set forth.

3. In a press of the class described, the combination of a hopper, a follower hinged at one end to operate in the hopper, a chain connected with the free end of the follower, a spur-gear traversed by said chain, means for exerting a constant tension upon the chain for advancing the follower into the hopper, and means for imparting a rotary movement to the spur-gear for advancing said chain in the direction of its strain, substantially as specified.

4. In a press of the class described, the combination of a hopper, a follower hinged at one end to operate in the hopper, a chain flexibly connected with the free end of the follower, a spur-gear traversed by said chain, means for exerting a constant tension upon the chain for advancing the follower into the hopper, and means for imparting a rotary movement to the spur-gear for advancing said chain in the direction of its strain, substantially as specified.

5. In combination, a hopper secured to a support, a follower hinged at one end to one side of the hopper, a sprocket-chain having connection with the free end of the follower and passing through an opening in the support and weighted at its free end to exert a constant strain on the follower, a shaft journaled in bearings, a spur-wheel secured to the shaft and having said chain passing thereover, and a ratchet-wheel and coöperating lever applied to the said shaft for imparting a rotary movement thereto, substantially as set forth.

6. The herein-described press, comprising a support, a hopper of approximately semicircular outline in cross-section and having upwardly-extending grooves in its walls and a discharge-opening in its bottom, hooked rods or bars securing the hopper to the support, a follower having rearwardly-extending arms pivotally connected to a pair of the hooked rods and having a centrally-disposed lug at its free end, a chain having detachable connection with the lug of the follower and passing through an opening in the support, a shaft mounted in bearings, a spur-wheel secured to the shaft and having the chain in engagement therewith, a ratchet-wheel mounted to rotate with the shaft, a lever placed upon the shaft and having a dog to engage with the teeth of the ratchet-wheel, and a detent for preventing backward rotation of the shaft, substantially as described.

In testimony that I claim the foregoing as my own I have hereto affixed my signature in the presence of two witnesses.

CHARLES W. BLACKBURN.

Witnesses:
AMALIA C. RAUTENBERG,
PETER MURPHY.